United States Patent
Holt

[15] 3,646,511
[45] Feb. 29, 1972

[54] WARNING CIRCUITS FOR ROAD VEHICLES

[72] Inventor: William David Holt, Colne, England
[73] Assignee: Joseph Lucas (Industries) Limited, Birmingham, England
[22] Filed: Apr. 29, 1970
[21] Appl. No.: 32,820

[30] Foreign Application Priority Data
June 9, 1969    Great Britain.....................29,035/69

[52] U.S. Cl. ...........................................340/52 D, 307/10
[51] Int. Cl. ...................................B60q 5/00, G08b 21/00
[58] Field of Search........................340/52, 52 D, 53; 307/10

[56] References Cited
UNITED STATES PATENTS
3,256,461   6/1966   Foreman et al.....................340/52 D Primary Examiner—Alvin H. Waring
Attorney—Holman & Stern

[57] ABSTRACT

In a warning circuit for a road vehicle for giving an indication to a driver if he attempts to leave the vehicle without removing the ignition key, one terminal of the vehicle battery is grounded and the other battery terminal is connected to ground through a warning device and a first grounded switch which is closed when the driver's door is opened. A second grounded switch is connected to the live battery terminal and is closed when the ignition key is in position, and means is provided for short circuiting the warning device when the first switch closes unless the second switch is still closed.

3 Claims, 1 Drawing Figure

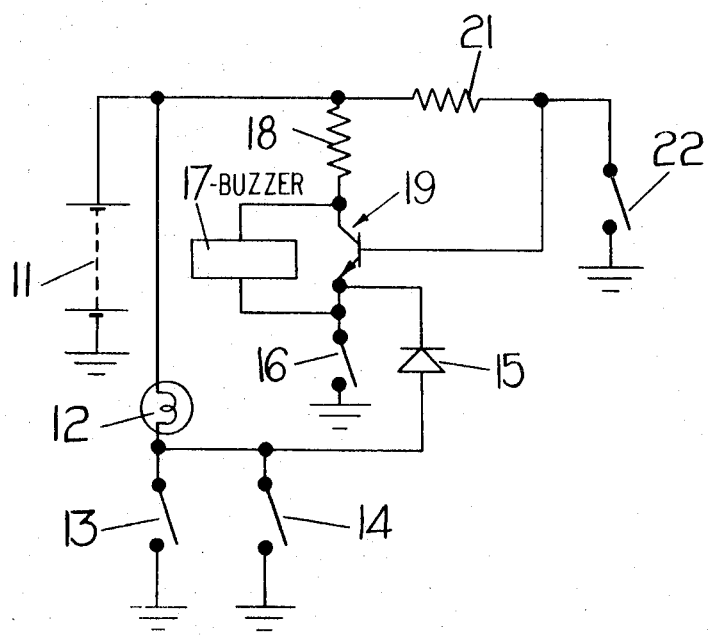

WARNING CIRCUITS FOR ROAD VEHICLES

This invention relates to warning circuits for road vehicles for giving an indication to a driver if he attempts to leave the vehicle without removing the ignition key.

A circuit according to the invention comprises in combination first and second terminals between which in use the vehicle battery is connected, the second terminal being earthed, a first earthed switch which is closed when the driver's door is opened, a warning device through which said first switch is connected to the first terminal, a second earthed switch which is connected to the first terminal and which is closed when the ignition key is in position, and means for short circuiting said warning device when the first switch closes if the second switch is still closed.

The accompanying drawing is a circuit diagram illustrating one example of the invention.

Referring to the drawing, the vehicle includes a battery 11 having its negative terminal earthed. The positive terminal of the battery is connected to one side of a courtesy light 12, the other side of which is earthed through three parallel paths containing respectively a switch 13, a switch 14 and a diode 15 and switch 16 in series. The switch 13 is operated by the passenger's door of the vehicle and closes when the door is open, the switch 14 is a manually operable switch within the vehicle, and the switch 16 is operated by the driver's door and closes when the driver's door is opened. Closure of any one of the switches 13, 14, 16 energizes the courtesy light 12.

The live side of the switch 16 is connected to the positive battery terminal through a buzzer 17 and a resistor 18 in series, and connected across the buzzer is the collector-emitter path of an NPN-transistor 19, the base of which is connected to the positive battery terminal through a resistor 21 and to earth through a switch 22. The switch 22 is operated by the ignition key of the vehicle, and closes when the ignition key is in position.

When the vehicle is being driven, the switch 22 will be closed and current will flow in the resistor 21, but no current will flow in the buzzer 17 or the transistor 19. When the driver stops the vehicle, he should remove the ignition key so that the switch 22 opens. When the driver's door is opened, the switch 16 closes, and the transistor 19 is turned on by current flow through the resistor 21, so short circuiting the buzzer 17. However, if the driver forgets to remove the ignition key, then the switch 22 stays closed and no base current is supplied to the transistor 19 when the switch 16 closes. In these circumstances a circuit is completed by way of the resistor 18 and buzzer 17 to give a warning to the driver.

The purpose of the diode 15 is to prevent the buzzer 17 from being operated when one of the switches 13, 14 is closed.

The arrangement described has the advantage that all the switches 13, 14, 16 and 22 can be earth return switches.

Having thus described my invention what I claim as new and desire to secure by Letters Patent is:

1. A warning circuit for road vehicles for giving an indication to a driver if he attempts to leave the vehicle without removing the ignition key, comprising in combination first and second terminals between which in use the vehicle battery is connected, the second terminal being earthed, a first earthed switch which is closed when the driver's door is opened, a warning device through which said first switch is connected to the first terminal, a second earthed switch which is connected to the first terminal and which is closed when the ignition key is in position, and means for short circuiting said warning device when the first switch closes unless the second switch is still closed.

2. A circuit as claimed in claim 1 in which the second earthed switch is connected to the first terminal through a resistor, and said short circuiting means is a transistor having its collector-emitter path connected across the warning device, and its base connected to the junction of the resistor and second earthed switch.

3. A circuit as claimed in claim 1 or claim 2 including a third earthed switch connected to the first terminal through a courtesy lamp, the third earthed switch being closed when a door other than the driver's door is opened, and a diode coupling the junction of the warning device and first switch to the junction of the courtesy lamp and third switch.

* * * * *